2,898,186

SOLUBILIZATION OF ACTINIDE METAL-CONTAINING SLAG

Horace H. Hopkins, Jr., Richland, Wash., assignor to the United States of America as represented by the United States Atomic Energy Commission No Drawing. Application July 16, 1953
Serial No. 368,535

5 Claims. (Cl. 23—14.5)

The present invention relates to a method for solubilizing the metal values contained in materials employed in and resulting from reduction of actinide rare earths to metallic form and particularly relates to solubilization of the actinide rare earth values contained in the slag materials resultant from the aforementioned metal reduction process.

The present invention is concerned with the actinide rare earths which have a normal tetravalent state. These are thorium, uranium, neptunium and plutonium. These elements are normally processed to obtain the metal by the reduction of the tetrafluoride with metallic calcium. In the course of the process for reducing tetravalent actinide rare earth fluorides with calcium in the presence of an iodine booster to obtain the pure metal, considerable amounts of the desired metal are lost in the slag which consists principally of calcium fluoride and calcium iodide. In order to recover the actinide element therefrom, it is necessary first to obtain said element in the form of an equeous solution of a salt which is then adaptable for further processing by conventional means, for recovery of the element, such as precipitation or solvent extraction. It is therefore necessary to dissolve these actinide element-containing solids in an aqueous solution.

Dissolution or leaching of the slag material in a strong nitric acid solution is comparatively unsatisfactory. Complete dissolution requires a long dissolution period at high temperatures, with its consequent corrosion of dissolver vessels. Leaching is unsatisfactory since recovery tends to be low, and an excessive amount of fines is formed. These fines tend to clog the pores of any filtering medium subsequently used and consequently make filtration of the leach solution difficult.

It is therefore an object of the present invention to provide a means for readily solubilizing actinide rare earth values contained in solid materials such as slags, and residue resulting from processes for reduction of actinide elements to the metallic form.

Other objects and advantages of the instant invention will be apparent from the description of the invention which follows.

I have discovered that the values of actinide rare earths having a tetravalent state contained in and/or associated with solid material, such as the slags resultant from processes for reduction of the actinide compounds to actinide metals, can be rendered readily soluble by subjecting said actinide rare earth-containing solid materials to a high temperature chloridizing roast until the material is substantially converted to the chloride form and thereafter leaching or dissolving the resultant chlorinated residue in an aqueous solution containing relatively low concentrations of a strong inorganic acid, suitably 0.008–0.1 N and preferably 0.01 N nitric acid. The resultant solution is readily adaptable to further processing for recovery of the actinide metal by conventional methods.

A typical slag obtained from the reduction of plutonium tetrafluoride with calcium had the following composition: 230 grams of calcium fluoride of which 50 grams is free calcium; 160 grams of calcium iodide and a trace of free iodine; and 6 grams of plutonium.

In accordance with the process of the instant invention, the plutonium-containing solids are subjected to a chloridizing roast effected by heating said solids for about three hours at a temperature elevated substantially above normal room temperature, suitably 600–800° C., and preferably about 700° C., while in contact with gaseous hydrogen chloride which is passed over the slag and in contact therewith. When cooled, the calcium halides, mainly the fluoride and the iodide, originally present in the solid mixture have been converted to chlorides which are more readily soluble in moderately acidic aqueous solutions containing about 0.01 M nitric acid.

When the slag is subjected to conventional leaching with strong acid heated to 70–90° C. in order to obtain plutonium in aqueous solutions which can be further processed for recovery of plutonium therefrom, and in the absence of the chloridizing roast prior to leaching, about 14% of the plutonium remains in the slag residues and only about 85% of the plutonium is recovered in the leach solution. These leach solutions are necessarily very strongly acidic since nitric acid leaches requiring at least 1 M $HNO_3$ and usually 4 M to 16 M are used. Therefore, such solutions must be diluted and/or neutralized to effect a suitable acid concentration for recovery of plutonium values therefrom.

The feasibility of the present process of solubilizing a plutonium-containing slag is demonstrated by the following example.

Example I

Approximately 1 gram of a plutonium-bearing slag was treated with gaseous hydrogen chloride, which gas was passed over this slag in a continuous steady stream during three hours heating at 700–730° C. After cooling the mixture, 19 ml. of 0.01 M nitric acid was added thereto in order to dissolve the plutonium and calcium chlorides. The final volume (19 ml. of solution) contained 7.4 mg. of plutonium. A small amount of insoluble residue which consisted mainly of silica contained 0.2 mg. of plutonium.

From the foregoing it is apparent that the plutonium values contained in the solid materials resulting from reduction of plutonium metal can be readily recovered therefrom by first subjecting these solid materials to a high temperature chloridizing roast in accordance with the process of this invention before dissolving in aqueous solution. Furthermore, the resultant residue is also readily soluble in aqueous solutions containing as little as 0.01 M nitric acid, whereas 4–5 M nitric acid solutions were required to leach only 85% of the plutonium values from like plutonium-containing solids.

The following example illustrates the use of the process of the present invention in the recovery of uranium values from the slag formed during the reduction of uranium tetrafluoride to the uranium metal by reducing the uranium salt with calcium metal in the presence of an iodine booster.

Example II

A 556-gram piece of slag which contained 310 grams $CaF_2$, 185 grams $CaI_2$, 50 grams Ca, 5 grams $SiO_2$, and 6 grams U was pulverized. The material was then treated with gaseous hydrogen chloride by passing the gas over the slag in a continuous steady stream for three hours while maintaining the material at about 700° C. The material was then cooled and introduced into 1100 ml. of 0.01 N $HNO_3$. An analysis of the resulting solution showed that 96.9% of the original uranium content of the slag was dissolved in the solution.

The scope of the applicant's invention is to be limited only by the scope of the claims appended hereto rather

What is claimed is:

1. The method of solubilizing values of an actinide rare earth element having a normal tetravalent state and contained in a calcium slag material, which comprises treating said material with gaseous hydrogen chloride at an elevated temperature, and then dissolving the resultant mixture in very dilute nitric acid.

2. The method of obtaining actinide rare earth values in a soluble form from a calcium material containing said rare earth values, which comprises treating said material with gaseous hydrogen chloride at 600–800° C., and then dissolving the resultant material in a 0.008–0.1 N $HNO_3$ solution.

3. The process of claim 1 wherein the actinide rare earth is uranium.

4. The process of claim 1 wherein the actinide rare earth is plutonium.

5. The method of solubilizing values of uranium contained in a calcium slag, which comprises treating said slag with gaseous hydrogen chloride at 700–730° C. whereby the uranium values are converted to the chloride form, and then leaching the resultant material with an aqueous 0.01 N nitric acid solution.

References Cited in the file of this patent

UNITED STATES PATENTS 1,239,885    Cleaves _____ Sept. 11, 1917